United States Patent
Sprunk et al.

(10) Patent No.: US 7,450,717 B1
(45) Date of Patent: Nov. 11, 2008

(54) SELF AUTHENTICATION CIPHERTEXT CHAINING

(75) Inventors: Eric J. Sprunk, Carlsbad, CA (US); Xin Qiu, Del Mar, CA (US)

(73) Assignee: General Instruments Corporation, Horsham, PA (US)

(*) Notice: Subject to any disclaimer, the term of this patent is extended or adjusted under 35 U.S.C. 154(b) by 858 days.

(21) Appl. No.: 09/588,828

(22) Filed: Jun. 7, 2000

Related U.S. Application Data

(60) Provisional application No. 60/138,412, filed on Jun. 8, 1999.

(51) Int. Cl.
*H04L 9/34* (2006.01)
(52) U.S. Cl. .............. 380/37; 380/42; 380/255; 713/150
(58) Field of Classification Search ............. 380/37, 380/255, 42; 713/179, 189, 150
See application file for complete search history.

(56) References Cited

U.S. PATENT DOCUMENTS

| | | | | |
|---|---|---|---|---|
| 5,265,164 A | * | 11/1993 | Matyas et al. | 380/30 |
| 5,412,728 A | | 5/1995 | Besnard et al. | |
| 5,491,749 A | * | 2/1996 | Rogaway | 713/171 |
| 5,495,533 A | | 2/1996 | Linehan et al. | |
| 5,548,648 A | * | 8/1996 | Yorke-Smith | 713/193 |
| 5,619,575 A | * | 4/1997 | Koopman et al. | 380/28 |
| 6,333,983 B1 | * | 12/2001 | Enichen et al. | 380/273 |

OTHER PUBLICATIONS

Feistel, Horst, et al., "Some Cryptographic Techniques for Machine-to-Machine Data Communications," Proceedings of the IEEE, vol. 63, No. 11, Nov. 1975, pp. 1545-1554.

Ehrsam, W. F., et al., "Fractional Block-Size Cipher," IBM Technical Disclosure Bulletin, Vo. 22, No. 1, Jun. 1979, pp. 60-642.

* cited by examiner

*Primary Examiner*—Kristine Kincaid
*Assistant Examiner*—Yin-Chen Shaw
(74) *Attorney, Agent, or Firm*—Larry T. Cullen

(57) ABSTRACT

Existing key encryption approaches are extended by using overlapping portions of encrypted information. Another provision inserts one or more bits of data to ensure correct encryption/decryption. The inserted data can also be used for authentication.

7 Claims, 4 Drawing Sheets

SELF AUTHENTICATION CIPHERTEXT CHAINING

CROSS-REFERENCES TO RELATED APPLICATIONS

This application claims priority from U.S. Provisional Patent Application No. 60/138,412, filed Jun. 8, 1999, the disclosure of which is incorporated herein in its entirety by reference for all purposes.

FIELD OF THE INVENTION

The present invention relates to cryptographic systems in general and in particular to a system for encrypting information efficiently using encryption keys having a fixed modulus size.

BACKGROUND OF THE INVENTION

Encryption is the process of converting a message from plaintext to ciphertext in such a way that only those that are authorized readers can decrypt the plaintext from the ciphertext. Often, encryption is used to secure a message that is expected to be transported through an untrusted channel or stored on an insecure data storage medium. The term "message" often refers to a communication between a sender and a receiver but as used here the term refers to any data that might need to be secured between the time and/or place of its creation or acceptance by the sender and the time and/or place of its receipt by the receiver. Thus, a message could be an e-mail communication, a program, a dataset, an image, a collection of data objects treated as a single message, a stream of data, or combinations of the above or similar objects.

One method of determining whether or not the receiver is authorized to read, or otherwise access, the plaintext of the message is the use of "keys". Typically a key is representable by data, such as a string of bits. An example is a 128-bit key, which is a string of 128 bits. Using this method, the sender would use an encryptor to encrypt the plaintext of the message into the ciphertext in such a way that any recipient of the ciphertext, authorized or not, that did not have knowledge of the key could not decrypt the plaintext from the ciphertext without some threshold of computing effort and/or time.

It is well understood that, except for a limited class of encryption schemes such as using one time pads, the plaintext can be extracted from the ciphertext without the key with enough computing effort and/or time. For example, an attacker (i.e., an unauthorized recipient) could attempt to decrypt the message by serially decrypting using each possible key. However, in a well-designed encryption system, the amount of computing effort needed to decrypt without the key costs more than the value of having decrypted the message or would take so much time that the value of keeping the message secure has passed before the message is decrypted.

There are several aspects of message security that an encryption system provides. One aspect is secrecy, in that the plaintext of a message can be kept from unauthorized readers even if the reader has possession of the ciphertext of the message. Another aspect is authentication, in that the recipient of the ciphertext can verify that the message was actually sent by the purported sender. Yet another aspect is integrity, in that the recipient can verify that the message was not modified after leaving the control of the sender. In some instances, only one aspect is used. For example, a digital signature process creates a data sequence that authenticates a message and that message is often sent "in the clear" so that anyone can read the message. Thus, the message is not kept secret, but it can still be authenticated. Although a system does not always encrypt a message before transport or storage, as is the case for digital signatures, the system is nonetheless generically referred to as an encryption system.

Encryption systems are often classified into private key systems and public key systems, often referred to as symmetric key systems and asymmetric key systems, respectively. In a private key system, the key is used by the sender to encrypt the message and the same key is used by the receiver to decrypt or verify the message. As a result, the key must be kept secret from unauthorized entities. With public key systems, the key is a pair of key parts comprising a public part and a private part. The public part is not necessarily kept secret and can be used to verify messages and perform other processes on a message, but typically the private key is needed to extract plaintext from the ciphertext of a secret message.

One example of a public key standard is the widely used RSA standard. One advantage of using a standard public key system is that many components of the system are readily available, such as e-mail encryptors, key managers, encoders, decoders, verifiers, and the like. However, a problem with many standard encryption systems is that they operate on the message in blocks of fixed sizes per key length, requiring padding when the message to be sent does not fill an integer number of blocks exactly. Random data should be used for padding, to avoid easy attacks on decrypting the message without the key.

The use of fixed size blocks is not a problem where messages are always sized to be an integer number of blocks, but where the messages are not an integer number of blocks, but instead comprise zero or more full blocks and a partial block, the partial block must be padded up to a whole block before processing. Where the amount of processing to encrypt, decrypt or verify a message is a function of the number of blocks and the amount of processing needed for a block is considerable, a processing routine might perform many unnecessary operations on a partial block if the message portion of the partial block is much smaller than the block size.

For example, the block size is often dictated by a key modulus used to encrypt a block. If the key modulus is 512 bits, messages will be encoded in 512 bit blocks. If a message to be encrypted happens to be 1025 bits long, the message would be encrypted into three 512-bit blocks, one of which would represent only one bit of the message.

SUMMARY OF THE INVENTION

In an encryption system according to one embodiment of the present invention, existing fixed key modulus size encryption approaches are extended to use overlapping portions of encrypted information in generating encrypted messages. In another aspect of the invention, the encryption system can insert one or more bits of data to ensure correct encryption/decryption and the inserted data can be used for authentication.

A further understanding of the nature and the advantages of the inventions disclosed herein may be realized by reference to the remaining portions of the specification and the attached drawings.

DESCRIPTION OF THE SPECIFIC EMBODIMENTS

Figure 1:
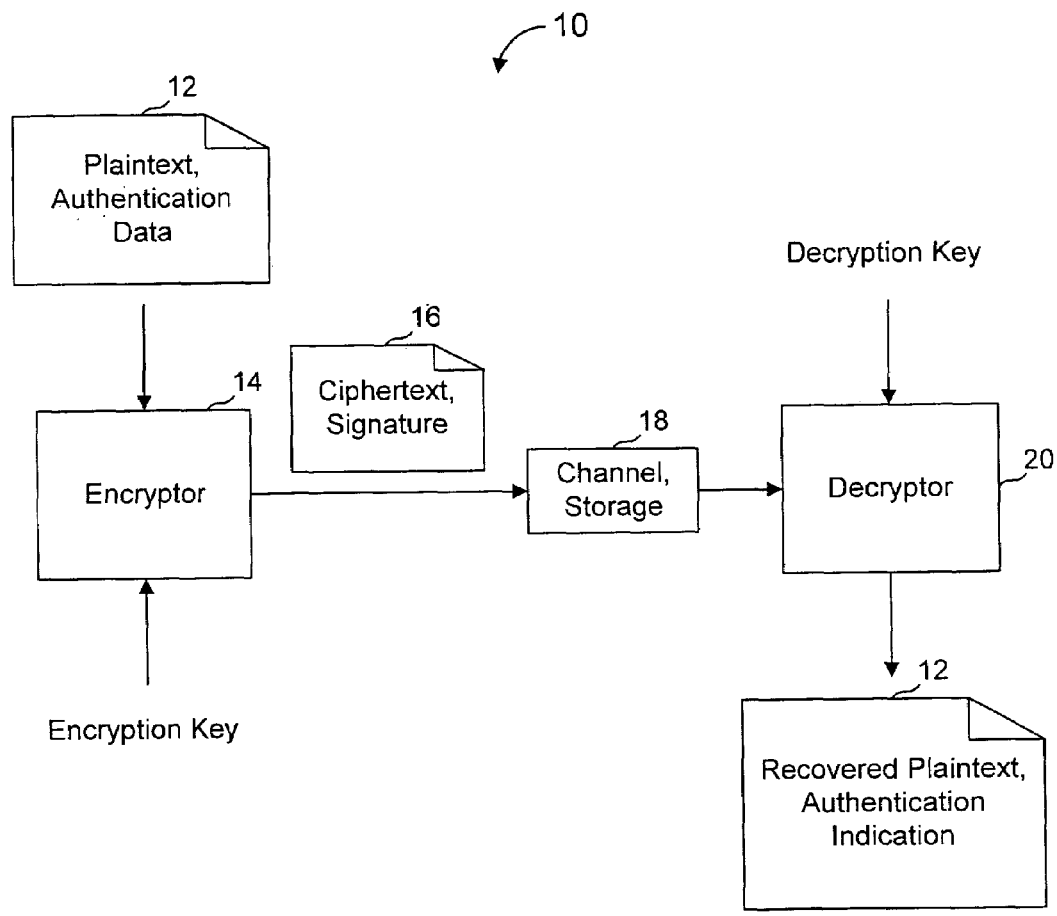
FIG. 1 is a block diagram of an encryption system as might be used to implement an embodiment of the present invention.

FIG. 1 is a block diagram of an encryption system 10, wherein plaintext 12 of a message is encrypted by an encryptor 14 using an encryption key to produce an encryptor output 16 that could be ciphertext, verification data (such as a digital signature), or both. Encryptor output 16 is conveyed to a channel and/or storage medium 18, where such channel or storage medium is untrusted and therefore considered insecure. A decryptor 20 receives encryptor output 16 from channel and/or storage medium 18 and, using a decryption key, produces plaintext or authorization indications 22.

In an encryption/decryption operation, the encryptor might encrypt plaintext, which the decryptor would decrypt to obtain the plaintext. In another operation, the encryptor might generate a digital signature that the decryptor could use to verify a message and issue an authenticated/unauthenticated signal.

Figure 2:
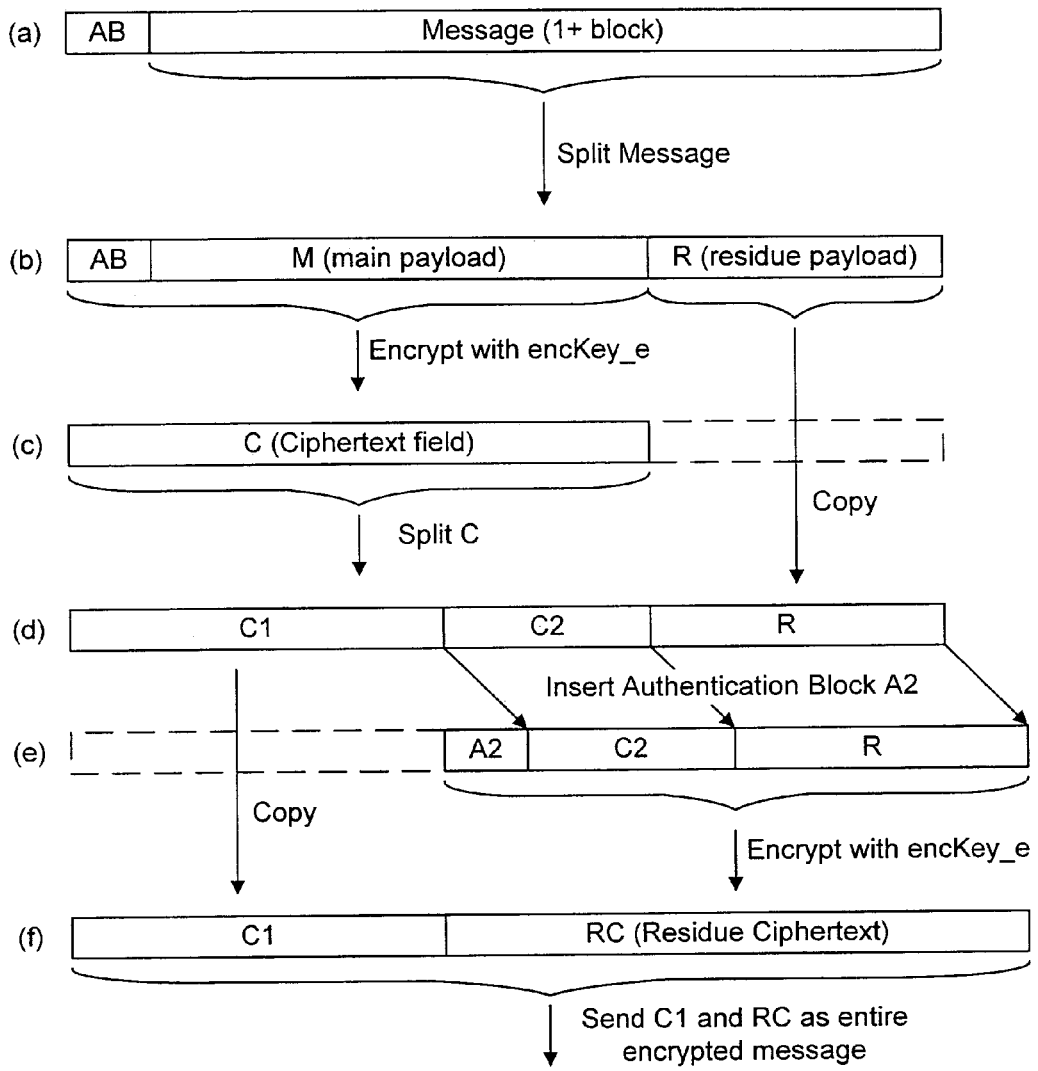
FIG. 2 is a flow diagram illustrating a process of encrypting a full block and a residue block of a message.

In a fixed modulus encryption operation, plaintext 12 is divided into blocks of the modulus size and where plaintext 12 is of a size not evenly divisible by the modulus, the encryption of the last full block and the partial remaining block of plaintext 12 is performed as shown in FIG. 2.

FIG. 2 is a series of transformations of the full block and the partial remaining block resulting in the encryption of that data. FIG. 2(a) illustrates a message and an authentication block, AB. AB could represent a number of data elements about the message. In one example, AB is a concatenation of a zero bit or byte (to prevent overflows), a unit identity address (such as a MAC address), a sequence number (to prevent replay attacks), and other data about the message. In the description below, the following variables are used to represent lengths of various elements:

AB_len length of AB field

Payload_len length of the data to be encoded (a full block and a partial block)

Enc_len length of blocks used in encoding process

As shown in FIG. 2(b), the encryptor logically splits the message into a main payload M and a residual payload R, where the split is done so that the length of M, len(M), is such that len(M)+AB_len=Enc_len. With that split, the length of R, is R_len=Payload_len−len(M)=Payload_len−Enc_len+AB_len.

As shown in FIG. 2(c), AB∥M (where "∥" is a concatenation operator) is encrypted using an encryption key encKey_e to produce a ciphertext field C where len(C)=Enc_len. In one embodiment, the blocks are encoded using an RSA encoding process. For example, C might be (AB∥M)^encKey_mod modulus_n, where values of Enc_len can be expressed as unique numbers less than modulus_n. As used here, lengths an be in any units, but a common measurement of data length is in bits.

As shown in FIG. 2(d), C is then divided into two fields, C1 and C2, where the lengths of C1 and C2 are such that the following equations are satisfied:

$$len(C2) = Enc\_len - A2\_len - len(R)$$
$$= 2*Enc\_len - A2\_len - Payload\_len - AB\_len$$
$$len(C1) = len(C) - len(C2)$$

where A2_len is the length of a secondary authentication block, A2, shown in FIG. 2(e).

Since the length of A2∥C2∥R is Enc_len, that concatenation can be encrypted using encKey_e, to produce a residue ciphertext, RC. As illustrated by FIG. 2(f), C1 and RC can be provided to a decryptor.

Figure 3:
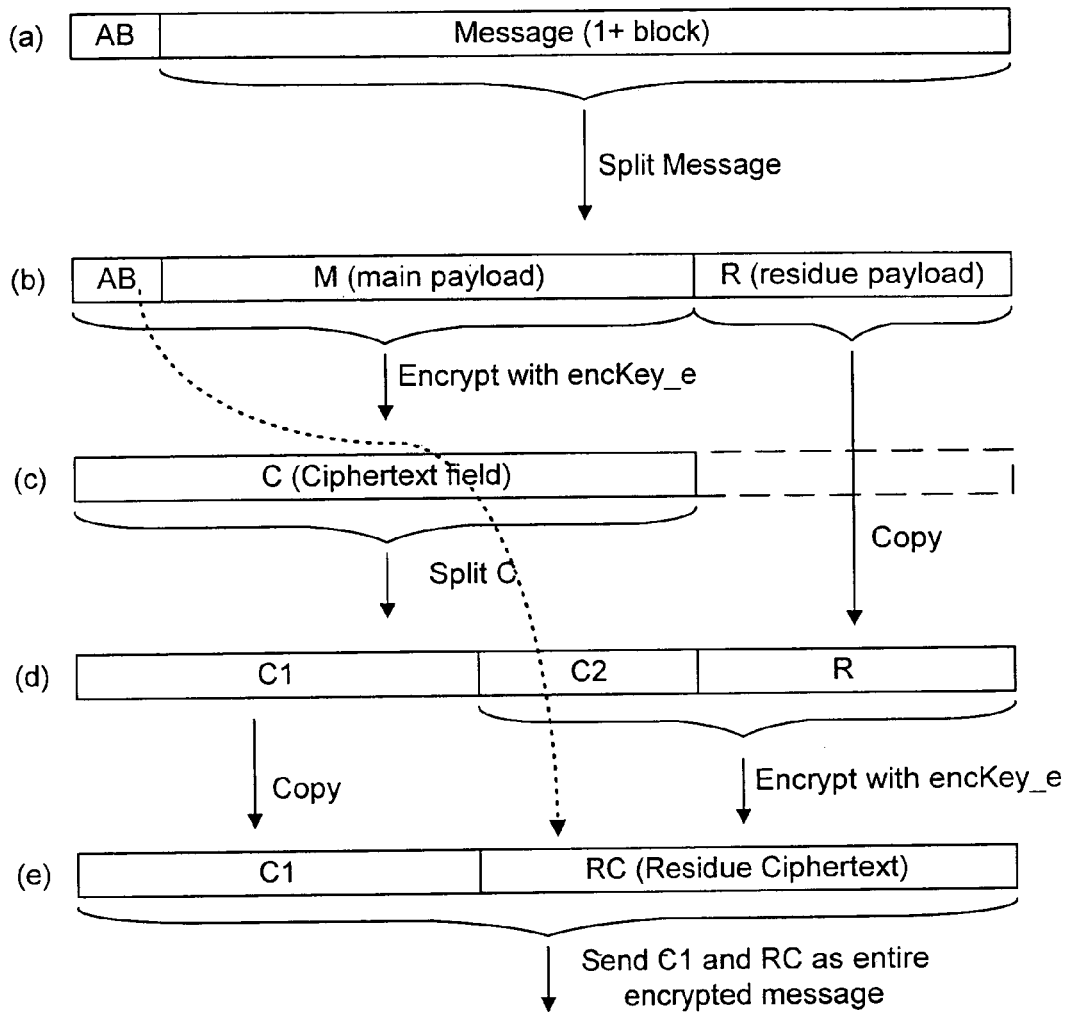
FIG. 3 is a flow diagram illustrating a variation of the process shown in FIG. 2, without the use of a secondary authentication block.

The insertion of a secondary authentication block, such as A2 in FIG. 2(e), is optional. Where A2 is not used, the authentication block AB would authenticate R, due to the overlap, since the cryptographic effects of AB feed through from ciphertext C2, which is combined with R and encrypted as shown by FIGS. 2(e)-(f). So long as there are enough bits in C2 for the feedthrough effect to be cryptographically valid (e.g., C2 being 128 bits or more), then the inclusion of A2 in the generation of RC is not needed to authenticate R. However, using A2 would be useful where C2 is too small. Thus, it should be understood that in the figures, len(A2) could range from zero to some positive value. FIG. 3 illustrates the feedthrough effect.

Figure 4:
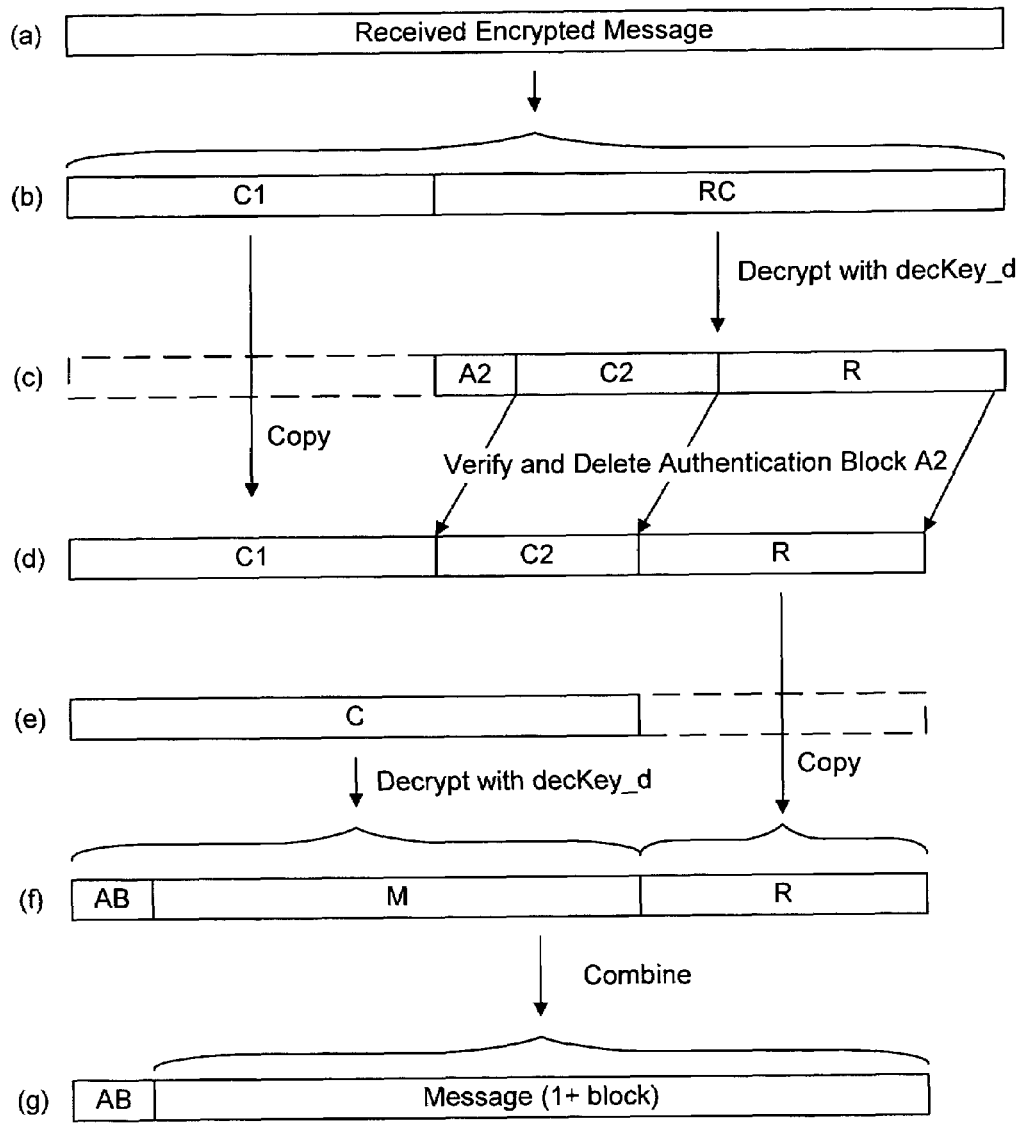
FIG. 4 is a flow diagram illustrating a process of decrypting a full block and a residue block of a message encrypted as shown in FIG. 2.

FIG. 4 is a flow diagram illustrating a process of decrypting a full block and a residue block of a message encrypted as shown in FIG. 2. As illustrated by FIGS. 4(a)-(b), the received block is split into a C1 portion and an RC portion. The decryptor can properly split its input into C1 and RC knowing only len(C1∥RC) and Enc_len, since len(RC)=Enc_len.

As shown in FIGS. 4(c)-(g), RC is decrypted and segmented into A2, C2 and R. The segmentation can be performed if the decryptor knows A2_len and either len(R) or Payload_len, Enc_len, AB_len, from which len(R) can be calculated. If A2 is used and cannot be verified, the message is discarded. Otherwise, the message is parsed into C1 and C2.

Once C1 and C2 are identified, they can be concatenated to form C, which can then be decrypted to produce AB and M. Finally, M and R can be combined to reconstruct the original plaintext message. If AB cannot be verified, the message is discarded. One case where the message is not verified is where the value for a key sequence is stored in AB and the message has a sequence number lower than, or out of order relative to, a prior received sequence number.

In the process of decrypting (see FIG. 4(c)), the decryptor verifies A2 and discards the message if A2 is other than expected. One cause for A2 being an unexpected value is if the ciphertext message had been altered as it passed from the encryptor to the decryptor. In one embodiment, A2 is simply a null value, such as a "0" bit or a "00" byte. Because of some overlap between C and RC through C2, the authentication of R can be done by just verifying that A2 is as expected and AB is as expected. In effect, this allows both blocks to be authenticated using just one authentication block, AB, resulting in bandwidth and processing savings. In operation, the strength of AB for authenticating the partial block is related to the amount of overlap, i.e., len(C2). The overlap, len(C2), should preferably be at least 128 bits.

One use of the system described above is for securely passing keys to a remote security chip that is only accessible over an untrusted channel.

Although the invention has been described with reference to particular embodiments thereof, these embodiments are merely illustrative, and not limiting, of the present invention, the scope of which is to be determined solely by the appended claims.

What is claimed is:

1. A method for encrypting information in a message that can be authenticated, the method comprising:
    adding a first authentication block to the information to be encrypted to form a concatenated field;
    logically subdividing the concatenated field into predetermined block lengths, including a residual field when the concatenated field is not sized as an even multiple of the predetermined block length;
    encrypting the subdivided fields using a first key to form cipher blocks;
    designating one of the cipher blocks as a designated cipher block, the other cipher blocks being nondesignated cipher blocks;
    subdividing the designated cipher block into a first cipher subblock and a second cipher subblock, such that a combined length of the second cipher subblock and the residual field and a second authentication block is the predetermined block length;
    encrypting the second cipher subblock and the residual portion together with the second authentication block using a second key to form a cipher residual block; and
    providing at least the first cipher subblock of the designated cipher block, the nondesignated cipher blocks and the cipher residual block as the message such that the message can be authenticated by decryption of a valid authentication block of either the first authentication block or the second authentication block.

2. The method of the claim 1, wherein the second authentication block comprises one or more bits and the second cipher subblock is less than 128 bits.

3. The method of claim 1, wherein the second authentication block comprises one or more bits forming a null value.

4. A method for encrypting and decrypting information in a message that can be authenticated, the method comprising:
    adding a first authentication block to the information to be encrypted to form a concatenated field;
    logically subdividing the concatenated field into predetermined block lengths, including a residual field when the concatenated field is not sized as an even multiple of the predetermined block length;
    encrypting the subdivided fields using a first key to form cipher blocks;
    designating one of the cipher blocks as a designated cipher block, the other cipher blocks being nondesignated cipher blocks;
    subdividing the designated cipher block into a first cipher subblock and a second cipher subblock, such that a combined length of the second cipher subblock and the residual field and a second authentication block is the predetermined block length;
    encrypting the second cipher subblock and the residual portion together with the second authentication block using a second key to form a cipher residual block;
    providing at least the first cipher subblock of the designated cipher block, the nondesignated cipher blocks and the cipher residual block as the message such that the message can be authenticated by decryption of a valid authentication block of either the first authentication block or the second authentication block;
    decrypting at least the cipher residual block to obtain a representation of the second authentication block;
    authenticating the message by comparing the representation of the second authentication block to an expected value for the second authentication block;
    decrypting the cipher blocks to obtain at least a representation of the first authentication block; and
    further authenticating the message by comparing the representation of the first authentication block to an expected value for the first authentication block.

5. A method for encrypting information in a message that can be authenticated, the method comprising:
    adding a first authentication block to the information to be encrypted to form a concatenated field;
    logically subdividing the concatenated field to include a residual field;
    encrypting the subdivided fields using a first key to form cipher blocks;
    designating one of the cipher blocks as a designated cipher block, the other cipher blocks being nondesignated cipher blocks;
    subdividing the designated cipher block into a first cipher subblock and a second cipher subblock;
    encrypting the second cipher subblock and the residual portion together with a second authentication block using a second key to form a cipher residual block; and
    providing at least the first cipher subblock of the designated cipher block, the nondesignated cipher blocks and the cipher residual block as the message such that the message can be authenticated by decryption of a valid authentication block of either the first authentication block or the second authentication block.

6. The method of the claim 5, wherein the second authentication block comprises one or more bits and the second cipher subblock is less than 128 bits.

7. The method of claim 5, wherein the second authentication block comprises one or more bits forming a null value.

* * * * *

UNITED STATES PATENT AND TRADEMARK OFFICE
CERTIFICATE OF CORRECTION

| | |
|---|---|
| PATENT NO. | : 7,450,717 B1 |
| APPLICATION NO. | : 09/588828 |
| DATED | : November 11, 2008 |
| INVENTOR(S) | : Sprunk et al. |

It is certified that error appears in the above-identified patent and that said Letters Patent is hereby corrected as shown below:

In Column 3, Line 63, please delete "an" and insert --can--

Signed and Sealed this

Twenty-seventh Day of October, 2009

David J. Kappos
*Director of the United States Patent and Trademark Office*